United States Patent Office

2,733,133
Patented Jan. 31, 1956

2,733,133

PRODUCTION OF TITANIUM MONOXIDE

William Thompson Cave and Arno H. Herzog, Dayton, Ohio, assignors to Monsanto Chemical Company, St. Louis, Mo., a corporation of Delaware No Drawing. Application September 1, 1954,
Serial No. 453,703

3 Claims. (Cl. 23—202)

This invention relates to a process for preparing titanium monoxide having a high degree of purity by the reduction of titanium dioxide with carbon.

Previous attempts to produce pure titanium monoxide by reduction of titanium dioxide with carbon have invariably yielded an impure product containing appreciable amounts of either titanium carbide or oxides of titanium other than titanium monoxide. Consequently, when titanium monoxide was required in pure form, it was generally prepared by heating together titanium dioxide and metallic titanium in the manner described by Brantley et al., Journal of the American Chemical Society, volume 52, pp. 3956 (1930). This latter method of preparation is not generally feasible for large-scale preparation of titanium monoxide, particularly when the monoxide is desired as a starting material for the production of metallic titanium.

We have now found that substantially pure titanium monoxide having a lattice constant, $a_0$, of at least 4.16 but not greater than 4.19 A. can be prepared by reacting titanium dioxide and carbon at temperatures slightly below the melting point of titanium monoxide, which melts at about 1775° C.

A preferred embodiment of the present invention comprises heating intimately admixed substantially equimolar proportions of solid titanium dioxide and solid carbon to a temperature above about 1750° C., but below the melting point of titanium monoxide. For best results the titanium dioxide and carbon should be finely ground and thoroughly intermixed. Ordinary pigment grade titanium dioxide and commercial graphite or carbon black or charcoal are satisfactory starting materials.

The reaction is conveniently carried out under reduced pressure, though the degree of vacuum is not particularly critical. When employing a relatively high vacuum, of the order of $10^{-2}$ mm. of Hg the reaction described herein will take place quite rapidly. With higher pressures the reaction is somewhat slower, but titanium monoxide of substantially identical purity can eventually be obtained. Since the titanium monoxide is readily oxidized to the dioxide (or to oxides intermediate between the monoxide and the dioxide) by oxygen at high temperatures, it is necessary that the heated zone containing the reaction mixture be freed of all oxygen and water vapor. This can be readily done by evacuating the reaction zone containing the reactants at around 600° to 700° C.

When carrying out the invention in the preferred manner described immediately above, i. e., with substantially equimolar proportions of intimately admixed solid reactants, the reaction will take place entirely in the solid and gaseous phases—thereby yielding pure titanium monoxide as a golden yellow solid having a melting point of about 1775° C. and a lattice constant, $a_0$, of at least 4.16 and not greater than 4.19 A.

The reaction can also be carried out with only a portion of the equimolar requirement of carbon intimately admixed with the titanium dioxide—provided that the reaction is carried out in a carbon-containing environment having sufficient additional carbon which is heated to 1700° C. or above. This additional carbon may be present either as vapor or as solid or as both vapor and solid.

For example, if finely divided and intimately admixed solid $TiO_2$ and graphite are mixed together in molar proportions of 1:0.5, respectively, placed in a carbon crucible and heated in a furnace at about 1750° C., the carbon in the crucible can supply the remainder of the one mole proportion of carbon required to convert the titanium dioxide to titanium monoxide.

When substantially less than the equimolar proportion of carbon (i. e., less than about 0.8 or 0.9 mole of carbon per mole of $TiO_2$) is utilized in the present process, the reaction mixture will pass through an intermediate molten phase at a temperature around 1700° C. The presence of this molten phase apparently facilitates the reaction of carbon from an external source (i. e., carbon not initially intimately admixed with the titanium dioxide), because the pure titanium monoxide product can then be obtained at temperatures as low as about 1700° C.

As will be readily apparent from the following examples, the molar proportion of solid carbon initially intimately admixed with the titanium dioxide can be varied from zero to one—provided that sufficient additional carbon is present in the immediately surrounding environment (e. g., in a carbon-containing crucible or similar container) to satisfy the overall requirement of one mole of carbon per mole of titanium dioxide to be reduced to titanium monoxide. In general, the reaction will proceed more rapidly and smoothly if at least a small amount, e. g., greater than about 0.1 or 0.2 molar proportions, of the carbon is initially intimately admixed with the titanium dioxide. It can also be seen from the following examples that the carbon utilized to reduce the titanium dioxide can be present initially as graphite or other form of elemental carbon, or as a carbide, such as titanium carbide.

*Example 1*

Titanium metal was melted in a graphite crucible and the crucible and metal cooled and removed from the furnace, after which the free metal was removed from the crucible. In this way a layer of titanium carbide was formed on the interior of the crucible.

$TiO_2$ was mixed thoroughly with graphite in the molar proportions of 1:1 and briquettes of the mixture placed in the prepared crucible. The crucible was placed into a graphite resistor furnace which was evacuated to a presture of $10^{-2}$ mm. of Hg and then heated to a red heat. Liberated gases were pumped out and the furnace raised to a temperature such that the charge within the crucible had reached a temperature of 1770° C. The charge was held at this temperature for about thirty minutes. After cooling in the furnace, the charge was removed. The charge had a sintered and a golden yellow appearance. A sample examined by means of X-ray diffraction was found to possess an $a_0$ value of 4.19 A, indicating that substantially no carbon had been absorbed by the titanium monoxide.

*Example 2*

Into a graphite crucible there were placed a number of briquettes, each consisting of a mixture of $TiO_2$ and graphite in the molar proportion of 1:1 so as to form TiO. The crucible was then placed into a high-frequency vacuum furnace and heated gradually to 1760° C. while applying a high vacuum to the heating zone. After holding the contents of the crucible at about 1760° C. for one half hour, the crucible was cooled in the vacuum and then removed from the furnace. The briquettes possessed a sintered appearance and a golden yellow color. A sample thereof examined by the X-ray method indicated a lattice constant, $a_0$, of 4.19.

*Example 3*

Pigment grade $TiO_2$ was mixed with graphite in the molar proportion of 1:0.8 and the mixture formed into a pellet by pressure. A number of pellets were placed in a TiC-lined graphite crucible, inserted into a resistor furnace and heated to out-gas the crucible contents, as described in Example 1. The crucible was then heated to 1750° C., maintained at this temperature level for approximately one hour, and then allowed to cool. The product had a lattice constant, $a_0$, of 4.17 A.

*Example 4*

Pigment grade $TiO_2$ was thoroughly mixed with graphite in the molar proportion of 1:0.5 and loosely tamped into a carbon crucible. The crucible and contents were out-gassed as described in Example 1, above, and then raised to a temperature of 1700° C. As in Example 3, the contents of the crucible melted. The temperature was maintained at this level for one and one-half hours, then cooled and removed from the furnace. A sample examined by means of X-ray diffraction possessed a lattice constant of 4.16 A.

*Example 5*

Pigment grade $TiO_2$ was placed into a graphite crucible and lightly tamped therein. The crucible was placed into a graphite resistor furnace, evacuated to a pressure of $10^{-2}$ mm. of Hg and then heated to a red heat. The liberated gases were pumped out and the crucible within the furnace raised to a temperature of 1700° C. As this temperature was reached a rapid evolution of gases occurred, accompanied by melting of the contents of the crucible. This was not the melting of pure TiO, but is believed to have been a eutectic mixture of oxides. The crucible temperature was then raised to 1750°, held at this temperature for about one hour and then cooled. A sample of the product examined by means of X-ray diffraction was found to possess an $a_0$ value of 4.19 A. The product had the golden yellow color characteristic of titanium monoxide.

This application is a continuation-in-part of our co-pending earlier filed applications, Serial Nos. 290,828 and 290,829, filed May 29, 1952, the latter application having been abandoned.

We claim:

1. The process for producing substantially pure titanium monoxide having a lattice constant, $a_0$, of at least 4.16 A. but not greater than 4.19 A., which comprises heating intimately admixed finely divided substantially equimolar proportions of solid titanium dioxide and solid carbon to a temperature above 1750° C. but below the melting point of titanium monoxide.

2. The process for preparing essentially pure titanium monoxide having a lattice constant, $a_0$, of between about 4.16 A. and about 4.19 A., which process comprises heating titanium dioxide having substantially less than equimolar quantity of finely divided carbon intimately admixed therewith, at a temperature above about 1700° C. and below the melting point of titanium monoxide in a carbon crucible until an intermediate fusion product has formed, and then further heating said product at a temperature above about 1700° C. and below the melting point of titanium monoxide until solid essentially pure titanium monoxide having a lattice constant, $a_0$, of at least 4.16 A. but not greater than 4.19 A. is formed.

3. The process for preparing essentially pure titanium monoxide having a lattice constant, $a_0$, between about 4.16 A. and about 4.19 A., which process comprises reacting titanium dioxide at a temperature above about 1700° C. and below the melting point of titanium monoxide with an equimolar quantity of carbon, substantially less than said equimolar quantity of carbon being finely divided and intimately admixed with said titanium dioxide, the remaining carbon being placed in sufficiently close proximity to said titanium dioxide to react therewith, said reaction being maintained at the aforesaid temperature until an intermediate fusion product has formed and thereafter continued at such temperature until solid essentially pure titanium monoxide having a lattice constant, $a_0$, of at least 4.16 A., but not greater than 4.19 A. is formed.

References Cited in the file of this patent

UNITED STATES PATENTS

| | | |
|---|---|---|
| 2,681,847 | Wainer et al. | June 22, 1954 |
| 2,681,848 | Wainer et al. | June 22, 1954 |
| 2,681,849 | Silbert et al. | June 22, 1954 |
| 2,698,221 | Wainer et al. | Dec. 28, 1954 |

OTHER REFERENCES

J. W. Mellor's "A Comprehensive Treatise on Inorganic and Theoretical Chemistry," vol. 7, pages 27 and 43. Longmans, Green and Co., N. Y.

"Titanium," by J. Barksdale, 1949 ed., pages 61, 94, 95. Ronald Press Co., N. Y.